United States Patent [19]

Mumcu et al.

[11] Patent Number: 4,689,361
[45] Date of Patent: Aug. 25, 1987

[54] COATING POWDERS BASED ON POLYAMIDE AND ADHESION IMPROVING DIISOCYANATE ADDITIVE FOR USE IN MELT FILM COATING METHOD

[75] Inventors: Salih Mumcu; Rainer Feldmann, both of Marl, Fed. Rep. of Germany

[73] Assignee: Huls Aktiengesellschaft, Marl, Fed. Rep. of Germany

[21] Appl. No.: 841,639

[22] Filed: Mar. 20, 1986

[30] Foreign Application Priority Data

Mar. 23, 1985 [DE] Fed. Rep. of Germany ....... 3510688

[51] Int. Cl.$^4$ .............................................. C08G 69/46
[52] U.S. Cl. .................................. 524/196; 524/100; 524/101; 524/186; 524/236; 525/432; 528/496; 428/474.4
[58] Field of Search ................. 524/98, 196, 236, 186, 524/100, 101; 528/496; 525/432

[56] References Cited

U.S. PATENT DOCUMENTS 4,334,056 6/1982 Meyer et al. ........................ 528/310

*Primary Examiner*—Harold D. Anderson
*Attorney, Agent, or Firm*—Quaintance, Murphy & Presta

[57] ABSTRACT

Coating powders for the melt film coating method, based on polyamides and adhesion improving additives. The polyamides are aliphatic homo- and/or copolyamides having at least six carbon atoms containing functional groups consisting of at least 80% of primary, secondary, or mixtures of primary and secondary amino groups. As the adhesion improving additive there is added from 0.1 to 10% by weight referred to the polyamides of an isophoronediisocyanate capped with lactams, an isophoronediisocyanate capped with acetonoxime or an isophoronediisocyanate capped with an oligomer of acetonoxime.

9 Claims, No Drawings

COATING POWDERS BASED ON POLYAMIDE AND ADHESION IMPROVING DIISOCYANATE ADDITIVE FOR USE IN MELT FILM COATING METHOD

CROSS-REFERENCE TO A RELATED APPLICATION

Applicants claim priority under 35 USC 119 for application P 35 10 688.3, filed Mar. 23, 1985, in the Patent Office of the Federal Republic of Germany.

BACKGROUND OF THE INVENTION

The field of the present invention is polyamide powders for the coating of metals.

The invention is particularly concerned with methods for the production of coating compositions, for the melt film coating method, based on polyamides and adhesion improving additives based on diisocyanates.

The state of the prior art of producing polamide powders may be ascertained by reference to U.S. Pat. Nos. 3,476,711; 3,900,607; 3,927,141; 3,966,838; 4,143,025; 4,195,162; 4,273,919; and 4,334,056; British Pat. Nos. 535,138; 688,771 and 1,408,975; West German Patent Document C 1,272,286; and the Kirk-Othmer "Encyclopedia of Chemical Technology", 2nd Ed., Vol. 16 (1968), under the section "Polyamide (Plastics)", pages 88–105, particularly page 92-polylauryllactam (nylon-12), and polyundecanamide (nylon-11), page 101 Solution Processes, and Powder Processing, pages 101–102, the disclosures of which are incorporated herein by reference.

The flame spraying and fluidized bed coating of nylon on a metal base is disclosed in U.S. Pat. No. 3,203,822.

The isophoronediisocyanates capped with lactams and acetonoximes used in the present invention are prepared as disclosd in U.S. Pat. No. 3,822,240.

The dimerisation and trimerisation of isophoronediisocyanate is disclosed in GB-PB 1,153,815 and GB-PS 1,386,399.

It is known to use pulverulent polyamide based coating compositions to prepare varnish type metal coatings. The coating is implemented by the melt-film coating method, that is, by the fluidized bed procedure, the flame spray method or by the electrostatic coating process.

The powders are prepared either by the precipitation method by precipitating the polyamide from solutions or by the grinding procedure by grinding the polyamide granulate or scrap at low temperatures.

Furthermore it is known to add adhesion improving additives to the powders. For instance, coating compositions made of plastics containing carbonamide groups are described in West German Patent Document C 1,271,286 for the preparation of coatings by the fluidized bed or flame spray methods, which are characterized by an adhesion-improving addition of a monomeric or oligomeric compound having amino-, epoxy-, carbonyl-, hydroxy-, mercapto-, nitrile-, or isocyanate-groups.

In Example 1 of West German Patent Document C 1,271,286 this addition consists of a dimerized toluylene-2,4-diisocyanate with two free isocyanate groups per molecule.

When an object heated to 320° to 350° C. is coated with such a polyamide powder in a fluidized bed, a well-adhering cross-linked coating is in fact achieved, however it is present as a foam and, therefore, unfit as corrosion protection for a metal surface.

British Pat. No. 1,408,975 describes a method for preparing coatings on metal objects by electrostatically dusting powders made of polyamides and/or copolyamides containing a phenol and then heating to a temperature above the melting points of the powders. An adduct in the form of a solid phenol having a melting point of 30° to 300° C. with mono-, di-, or polyisocyanates is added to the powders and heating is performed for 3 to 25 minutes to 220° to 250° C. maximum so that no crosslinking of the polyamides takes place. This method accordingly is applicable only by electrostatically coating within the stated temperature range. However, as regards fluidized bed coatings which require substrate temperatures that are higher by 100° to 150° C. than the 220°–250° C. range, powders so applied produce crosslinked foams providing no corrosion protection to the melt surface as in West German Patent Document C 1,271,286.

The state of the art, therefore, does not permit, as a rule, the use of the melt film process for the preparation of well adhering coatings based on polyamides.

SUMMARY OF THE INVENTION

Having in mind the limitations of the prior art it is an object of the present invention to provide a polyamide based coating powder applicable to all melt film coating methods.

This object is achieved by coating powders for the melt film process, based on polyamides and adhesion improving additives based on diisocyanate containing, besides conventional additives, aliphatic homopolyamides, aliphatic copolyamides, or mixtures thereof having at least six carbon atoms containing functional groups which consist of at least 80% of primary, secondary, or mixtures of primary and secondary amino groups and, as the adhesion improving additive, from 0.1 to 10% by weight referred to the weight of the polyamides of an isophoronediisocyanate capped with lactams, an isophoronediisocyanate capped with acetonoxime, or an isophoronediisocyanate oligomers capped with acetonoxime.

DESCRIPTION OF THE PEFERRED EMBODIMENTS

Applicable polyamides of the present invention are aliphatic homo- or copolyamides having at least six carbon atoms or mixtures of homo- and copolyamides of which the reactive functional groups consist of at least 80% of primary, secondary, or mixtures of primary and secondary amino groups.

Such polyamides are prepared by the conventional polycondensation or polymerization procedures, in the presence of an excess of di- or polyamines. The excess of amine to be used depends on the desired molecular weight. As a rule, this excess is 0.05 to 3% by weight referred to the monomer (lactam, aminocarboxylic acid or salt from diamine and dicarboxylic acid) of the polyamide to be prepared.

In any event, the conversion during the polyreaction of the present invention must be carried out far enough so that at least 80% of the reactive functional groups of the polyamide consist of primary, secondary or mixtures of primary and secondary amino groups. The amino groups may be located at the ends of chains and-/or in the chain and/or as side groups of the polymer chain. Preferably polyamides are used which bear primary amino groups at both chain ends.

Conventional compounds such as hexamethylenediamine, 2-methylpentanediamine-(1,5), octamethylenediamine-(1,8), dodecamethylenediamine, isophoronediamine, trimethylhexamethylenediamine are used as the diamines controlling the molecular weight. Applicable polyamines illustratively are diethylenetriamine, triethylenetetramine, tetraethylenepentamine and dipropylenetriamine.

Accordingly, applicable polyamides are polyamide 6, polyamide 8, polyamide 11, polyamide 12 and, furthermore, polyamides with more than 12 aliphatically bound carbon atoms per carbonamide group. Moreover, the corresponding copolyamides or mixtures of homo- and copolyamides are useful.

Preferably polyamides are used which have at least ten aliphatically bound carbon atoms, or copolyamides of the mixtures of homo- and copolyamides which contain at least 70% by weight of the polyamides having at least ten carbon atoms. Accordingly, as comonomers they may contain up to 30% by weight of one or more comonomers such as caprolactam, hexamethylenediamine, 2-methylpentanediamine-(1,5), octamethylenediamine-(1,8), dodecamethylenediamine, isophoronediamine, trimethylhexamethylenediamine, adipic acid, suberic acid, azelaic acid, sepacic acid, dodecanoic diacid, and aminoundecanoic acid.

Furthermore, mixtures of polyamides may be used which consist of polyamides having amino groups and such without functional end groups or side groups.

The homo- and copolyamides designated below as polyamides initially are obtained in the form of granulates or scrap having a relative solution viscosity of between 1.4 and 2.0 as measured in 0.5% m-cresol solution at 25° C. according to German Industrial Standard DIN 53,727.

The powder preparation takes place according to the state of the art either by the cold grinding method or by precipitation from solution.

The expression "isophoronediisocyanates" covers both the monomeric, dimeric or trimeric diisocyanates as well as the oligomers extended by diols. These isocyanates are capped with lactams, preferably caprolactam or acetonoxime.

Illustratively applicable are the products sold by Hüls AG, Marl, West Germany, under the trade names of IPDI B 1065, IPDI B 1530, and IPDI BF 1540.

Preferably a mixture is used which consists of a monomeric isophoronediisocyanate capped with caprolactam and trimerized isophoronediisocyanate capped with caprolactam.

Examples of the isophoronediisocyantes capped with lactams, isophoronediisocyanates capped with acetonoximes and isophoronediisocyanate oligomers capped with acetonoximes include.

| POLYAMIDE | IPDI-ADDUCT |
|---|---|
| $\eta$rel = 1.6–1.7 [NH$_2$] = 110–130 meq/kg [COOH] = 6 meq/kg | |
| 100 parts by weight of polyamide 12 | 1 part by weight of an adduct from 2 moles isophoronediisocyanate (IPDI), 1 mole diethyleneglycol, and 2 moles caprolactam |
| 100 parts by weight of polyamide 12 | 2 parts by weight of a mixture of adducts from 1 part by weight of IPDI capped with caprolactam and 1 part by weight of trimerized IPDI capped with caprolactam (IPDI T-1890) |
| 100 parts by weight of polyamide 11 | 1.5 parts by weight of trimerized IPDI (IPDI T-1890) capped with acetonoxime |
| 100 parts by weight of polyamide 11 | 1.8 parts by weight of a mixture of adducts from 0.9 parts by weight of trimerized IPDI (IPDI T-1890) capped with caprolactam and 0.9 parts by weight of IPDI capped with acetonoxime |

The adhesion improving additive is added in an amount of 0.1 to 10% by weight referred to the polyamide powder, preferably 0.2 to 5% by weight.

As a rule, however, the powder grains advantageously are coated with the adhesion improving product by suspending the powder in a solvent, for instance ethanol, by adding the adduct soluble in ethanol and by drying the suspension preferably in a paddle drier to a residual moisture content of 0.15% by weight at a temperature between 50° and 100° C.

When the precipitation powder is used, the addition of the adhesion improving adduct also may take place before or after the precipitation stage. Preferably the adduct is introduced into the mixture during the precipitation process at reactor content temperatures less than 130° C.

The process of the present invention also can be applied to powders containing such pigments as $TiO_2$, lampblack, $BaSO_4$, ZnS, cadmium red, iron oxide, and stabilizers.

SPECIFIC EXAMPLES

Example 1

To 100 parts by weight of cold ground powder made from polyamide 12 polymerized in the presence of 1 molar percent of hexamethylenediamine (referred to lauryllactam) and having the following analytical properties:

$\eta_{rel} = 1.65$

[NH$_2$] = 122 meq/kg

[COOH] = 6 meq/kg are added 150 parts by weight of ethanol and 1 part of adduct from isophoronediisocyanate (IPDI) and caprolactam, and the suspension is dried at the end in a paddle drier at 70° C. to a residual moisture content of 0.15% by weight.

This powder is used to coat 1 mm sheetmetal previously heated in a circulating air over to 400° C. On the average the coating thickness is 300 μm.

The coatings were checked for bubble level and the coated sheetmetals were stored in boiling water.

RESULT: No bubbles, no under-rust at 150 hours.

EXAMPLE 2

Starting with 100 parts by weight of the polyamide of Example 1, a precipitation powder is prepared by precipitation from ethanol, 2 parts by weight of a 1:1 mixture of the adducts from IPDI and trimerized IPDI with caprolactam being added to the reaction mixture prior to the precipitation in the cooling stage at 128° C. After the powder is processed, coatings are prepared as described in Example 1, checked for bubbles and stored in boiling water.

RESULT: No bubbles, no under-rust at 150 hours.

EXAMPLE 3

A precipitation powder is prepared from 100 parts by weight of the polyamide from Example 1 by precipitation from ethanol, with 3 parts by weight of an IPDI adduct extended by neopentylglycol and capped with caprolactam being introduced into the reaction mixture following precipitation and at the suspension temperature of 70° C. The coatings described in Example 1 are carried out after the processing. The coatings were checked for bubbles and stored in boiling water.

RESULT: No bubbles, no under-rust at 150 hours.

Comparison Example 1

The procedure is the same as in Example 1, however, the polyamide used is an uncontrolled polyamide 12 having $\eta_{rel}=1.65$. A foamy coating is obtained. The under-rust was visible after one day.

Comparison Example 2

The procedure is the same as in Example 2, however, the phenol-blocked trimerized IPDI and the phenol-blocked IPDI known from British Pat. No. 1,408,975 are added to the precipitation mixture in a ratio of 1:1. Following the processing of the powder, all the coatings obtained are foams. No check of under-rust was carried out because the sheetmetal surface when viewed under the microscope was protected only in points against corrosion.

Comparison Example 3

The procedure is the same as in Example 1, however, without the adduct of the present invention. The coatings are free from bubbles. Under-rust is evident after 30 hours.

What we claim is:

1. In a coating powder for the melt film process based upon polyamide and diisocyanate based adhesion improving additive therefor, the improvement comprising said polyamide selected from the group consisting of an aliphatic homopolyamide, an aliphatic copolyamide and mixtures thereof having at least six carbon atoms per carbonamide group and containing functional groups consisting of primary amino groups, secondary amino groups, and mixtures thereof, and said adhesion improving additive comprising from 0.1 to 10% by weight referred to the weight of said polyamide of a diisocyanate selected from the group consisting of isophoronediisocyanate capped with lactam, isophoronediisocyanate capped with acetonoxime, and isophoronediisocyanate oligomer capped with acetonoxime.

2. The coating powders of claim 1, wherein said adhesion improving additive has a concentration of 0.2 to 5% by weight.

3. The coating powder of claim 2, wherein said adhesion improving additive is a mixture of monomeric isophoronediisocyanate capped with caprolactam and trimerized isophoronediisocyanate capped with caprolactam.

4. The coating powder of claim 2, wherein said polyamide has a content of at least 70% of said polyamide having at least ten aliphatically bound carbon atoms per carbonamide group.

5. A method for preparing a coating powder for the melt film process based upon a polyamide and a dissocyanate based adhesion improving additive therefor, comprising:
   (a) said polyamide selected from the group consisting of an aliphatic homopolyamide, an aliphatic copolyamide, and mixtures thereof having at least six carbon atoms per carbonamide group and containing functional groups consisting of at least 80% of amino groups selected from the group consisting of primary amino groups, secondary amino groups and mixtures thereof;
   (b) reducing said polyamide of (a) to particles; and
   (c) coating said particles with 0.1 to 10% by weight of said additive referred to the weight of said polyamide, said additive comprising a diisocyanate selected from the group consisting of isophoronediisocyanate capped with lactam, isophoronediisocyanate capped with acetonoxime and isophoronediisocyanate oligomer capped with acetonoxime.

6. A method for preparing a coating powder for the melt film process based upon a polyamide and a diisocyanate based adhesion improving additive therefor, comprising:
   (a) said polyamide selected from the group consisting of an aliphatic homopolyamide, an aliphatic copolyamide, and mixtures thereof having at least six carbon atoms per carbonamide group and containing functional groups consisting of at least 80% of amino groups selected from the group consisting of primary amino groups, secondary amino groups, and mixtures thereof;
   (b) suspending said polyamide in a suspension agent;
   (c) precipitating said polyamide from suspension agent as particles;
   (d) mixing said adhesion improving additive comprising from 0.1 to 10% by weight referred to the weight of said polyamide, said additive comprising a diisocyanate selected from the group consisting of isophoronediisocyanate capped with lactam, isophoronediisocyanate capped with acetonoxime and isophoronediisocyanate oligomer capped with acetonoxime with said particles; and
   (e) removing said suspension agent and separating said particles coated with said adhesion improving additive as said coating powder.

7. A method for preparing a coating powder for the melt film process based upon a polyamide and a diisocyanate based adhesion improving additive therefor, comprising:
   (a) said polyamide selected from the group consisting of an aliphatic homopolyamide, an aliphatic copolyamide and mixtures thereof having at least six carbon atoms per carbonamide group and containing functional groups consisting of a least 80% of amino groups selected from the group consisting of primary amino groups, secondary amino groups, and mixtures thereof;
   (b) suspending said polyamide in a suspension agent;
   (c) mixing said adhesion improving additive comprising from 0.1 to 10% by weight referred to the weight of said polyamide, said additive comprising a diisocyanate selected from the group consisting of isophoronediisocyanate capped with lactam, isophoronediisocyanate capped with acetonoxime and isophoronediisocyanate oligomer capped with acetonoxime with said polyamides in suspension;
   (d) coprecipitating said polyamide and adhesion improving additive as particles; and
   (e) removing said suspension agent and separating said particles coated with said adhesion improving additive as said coating powder.

8. The method of claim 6, wherein said suspension agent is a solvent for said polyamides.

9. The methods of claim 7, wherein said suspension agent is a solvent for said polyamides.

* * * * *